United States Patent [19]
Wurz et al.

[11] Patent Number: 5,838,253
[45] Date of Patent: Nov. 17, 1998

[54] RADIO FREQUENCY IDENTIFICATION LABEL

[75] Inventors: Albert Wurz, Doylestown; Richard J. Skokowski, Jr., Green Lane, both of Pa.

[73] Assignee: Accu-Sort Systems, Inc., Telford, Pa.

[21] Appl. No.: 442,695

[22] Filed: May 17, 1995

[51] Int. Cl.$^6$ ...................................................... H04Q 1/00
[52] U.S. Cl. .................... 340/825.54; 340/505; 340/572; 340/568; 340/573; 340/825.49; 340/825.35; 235/380
[58] Field of Search .............................. 340/825.54, 505, 340/572, 568, 825.49, 825.35, 573; 429/193; 235/380

[56] References Cited

U.S. PATENT DOCUMENTS

| | | | |
|---|---|---|---|
| 3,707,711 | 12/1972 | Cole et al. | 340/280 |
| 3,772,668 | 11/1973 | Smith | 340/224 |
| 4,195,121 | 3/1980 | Peterson | 429/127 |
| 4,724,427 | 2/1988 | Carroll | 340/572 |
| 4,807,140 | 2/1989 | Saulnier | 364/468 |
| 4,837,568 | 6/1989 | Snaper | 340/825 |
| 4,857,893 | 8/1989 | Carroll | 340/572 |
| 4,878,094 | 10/1989 | Balkanski | 357/5 |
| 5,073,684 | 12/1991 | Miyabayashi | 174/260 |
| 5,102,753 | 4/1992 | Rossoll et al. | 429/192 |
| 5,124,508 | 6/1992 | DuBrucq | 174/260 |
| 5,147,985 | 9/1992 | DuBrucq | 174/260 |
| 5,153,583 | 10/1992 | Murdoch | 340/825 |
| 5,338,625 | 8/1994 | Bates et al. | 429/193 |
| 5,347,263 | 9/1994 | Carroll et al. | 340/572 |
| 5,367,431 | 11/1994 | Kunishi et al. | 361/502 |
| 5,457,447 | 10/1995 | Ghaem et al. | 340/825.54 |
| 5,517,188 | 5/1996 | Carroll et al. | 340/825.54 |

FOREIGN PATENT DOCUMENTS

| | | | |
|---|---|---|---|
| 0350235 | 1/1990 | European Pat. Off. | G06K 19/06 |
| WO9512901 | 5/1995 | WIPO | H01M 6/40 |

*Primary Examiner*—Michael Horabik
*Assistant Examiner*—Yonel Beaulieu
*Attorney, Agent, or Firm*—Volpe and Koenig, P.C.

[57] ABSTRACT

An RF identification label includes a selectively activatable battery and control and RF generating circuitry which is coupled to the battery. The battery includes two separate components which are brought together in operative contact to activate the battery and provide power to the control and RF generating circuitry. The preferred embodiment of the control and RF generating circuitry includes a programmable integrated circuit with contacts which permit programming by a user to define the identification signal which is generated.

13 Claims, 6 Drawing Sheets

RADIO FREQUENCY IDENTIFICATION LABEL

BACKGROUND OF THE INVENTION

1. Field of the Invention

The present invention relates generally to identification labels. More particularly, the invention relates to an active radio frequency identification label which includes an activatable battery for remotely detecting, identifying and tracking goods, packages, baggage or similar items.

2. Description Of Related Art

The automated package identification industry is currently dominated by optical scanning technologies and labels, such as bar code scanning and optical character recognition. Optical labels are suitable for use in many applications, however, they have two basic limitations: a relatively short reading range and poor readability under harsh environmental conditions. Correct positioning of a label on a package for accurate reading by a scanner is very time-consuming. When many packages are grouped together and labels are otherwise obscured, marred or unreadable, such as on a conveyor, it may be difficult or impossible to provide a line of sight between the scanner and the bar code label. Accordingly, the scanner will be unable to read the label.

The use of radio frequency (RF) identification labels overcomes many of these limitations and provides additional advantages over optical labels. RF identification labels use a transceiver or a transponder which is placed on the item being tracked. The label transmits encoded data on a selected frequency and the RF signal is received by an antenna. The RF signals generated by these labels can be read at a distance from the receiving antenna. Additionally, since there is no requirement to have a direct line of sight between the RF label and the receiving antenna, an obscured RF labeled item can still be easily read.

RF identification labels are generally categorized as either passive or active, based upon the power source used to power the label. Passive RF labels do not contain an independent power source. They rely solely on the power from an externally supplied RF carrier to supply all of the label's power requirements. This provides a virtually unlimited shelf life and low cost since the problems of charging and maintaining a battery are eliminated. However, passive RF labels tend to have a limited transmission range.

A typical passive RF label is disclosed in U.S. Pat. No. 5,153,583 (Murdoch) which discloses a portable, passive transponder having a single inductive coil for simultaneous reception of signals from, and transmission of signals to, an interrogating unit. The transponder receives its power from an inductive powering field created by the interrogating unit and capacitively stores the received energy.

In contrast, conventional active RF labels include a self-contained power source, or battery. These labels have more power available than a passive label which greatly increases the data transmission rate and transmission range of the label. These devices are typically activated by a switch when operation of the device is desired. Since no strong external RF interrogating field is required to power the label, communication interference and worker safety concerns are reduced.

A conventional active RF identification label is disclosed in U.S. Pat. No. 3,772,688 (Smith). Smith discloses a freight security system comprising a base station and a plurality of active transponders. Each transponder includes a battery and a switch, which is manually switched to the "on" position when the transponder is placed on an item to be tracked. The base station includes a transceiver which detects when a transponder leaves a designated area.

Since active RF labels include a battery, their shelf life is limited to the life of the battery. Although a shelf life of up to ten years can be achieved by utilizing lithium batteries, such batteries greatly add to the expense of conventional active RF identification labels and pose environmental problems at the time of disposal. Additionally, conventional active RF labels are impractical for high-volume, low-cost applications wherein the label is discarded after a single use.

It would be desirable to provide a low-cost RF identification label which has a shelf life comparable to a passive RF label, yet provides the operational advantages associated with a conventional active RF label.

SUMMARY OF THE INVENTION

The present invention provides an RF identification label which includes a selectively activatable battery. The label includes control and RF generating circuitry which is coupled to the battery. The battery comprises two separate components which are brought together in operative contact to activate the battery and thereby provide power to the control and RF generating circuitry. The preferred embodiment of the control and RF generating circuitry comprises a programmable integrated circuit chip with contacts which permit programming by a user to define the identification signal which is generated.

Accordingly, it is an object of the present invention to provide a relatively low-cost active RF identification label which has an extended shelf life prior to usage.

Other objects and advantages of the invention will be apparent to those skilled in the art from the description of a presently preferred embodiment.

DETAILED DESCRIPTION OF THE PREFERRED EMBODIMENT

Figure 1:
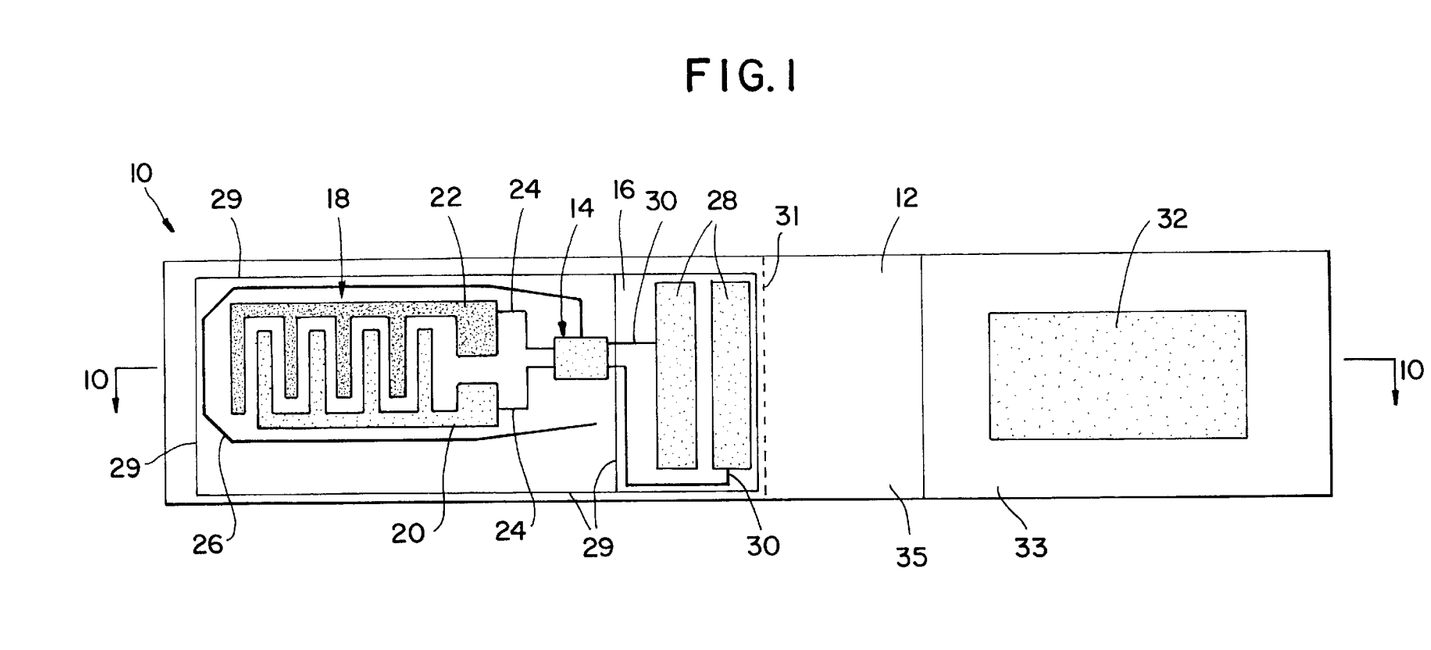
FIG. 1 is an elevated view of an active RF identification label according to the teachings of the present invention.

Referring to FIG. 1 there is shown an active radio frequency (RF) identification label 10. The label 10 preferably comprises a thin rectangular strip 12 of flexible material of the type conventionally used for baggage labels and may be plastic, paper, cardboard, a synthetic, natural, woven or non-woven material. A substrate 16 is mounted in a conventional manner, such as via an adhesive, to the strip 12. The substrate 16 supports a control circuit 14, a first battery portion 18, an antenna 26, and programming contacts 28. The substrate 16 also includes a small lip 29 which surrounds the components located on the substrate 16.

The first battery portion 18 comprises an anode 20 and a cathode 22. The anode 20 and cathode 22 are connected to power the control circuit 14 via conductors 24. The conductors 24 are made of conventional materials such as conductive ink, thin film, or metallic foil. Programming contacts 28, which are coupled to the control circuit 14 via conductors 30, enable a user to program the label 10 with the desired identification signal as will be described in detail hereafter.

A second battery portion 32 is provided on the end of the strip 12 opposite the end on which the substrate 16 is mounted. The second battery portion 32 serves as a substrate for an electrolytic material. In the preferred embodiment, the battery comprises zinc-manganese dioxide; wherein the anode 20 is magnesium dioxide, the cathode 22 is zinc and the electrolyte is an aqueous gel of ammonium chloride and zinc chloride. One skilled in the art would appreciate that there are many other materials that may be substituted for the materials used in the preferred embodiment without departing from the spirit and scope of the present invention.

Figure 9:
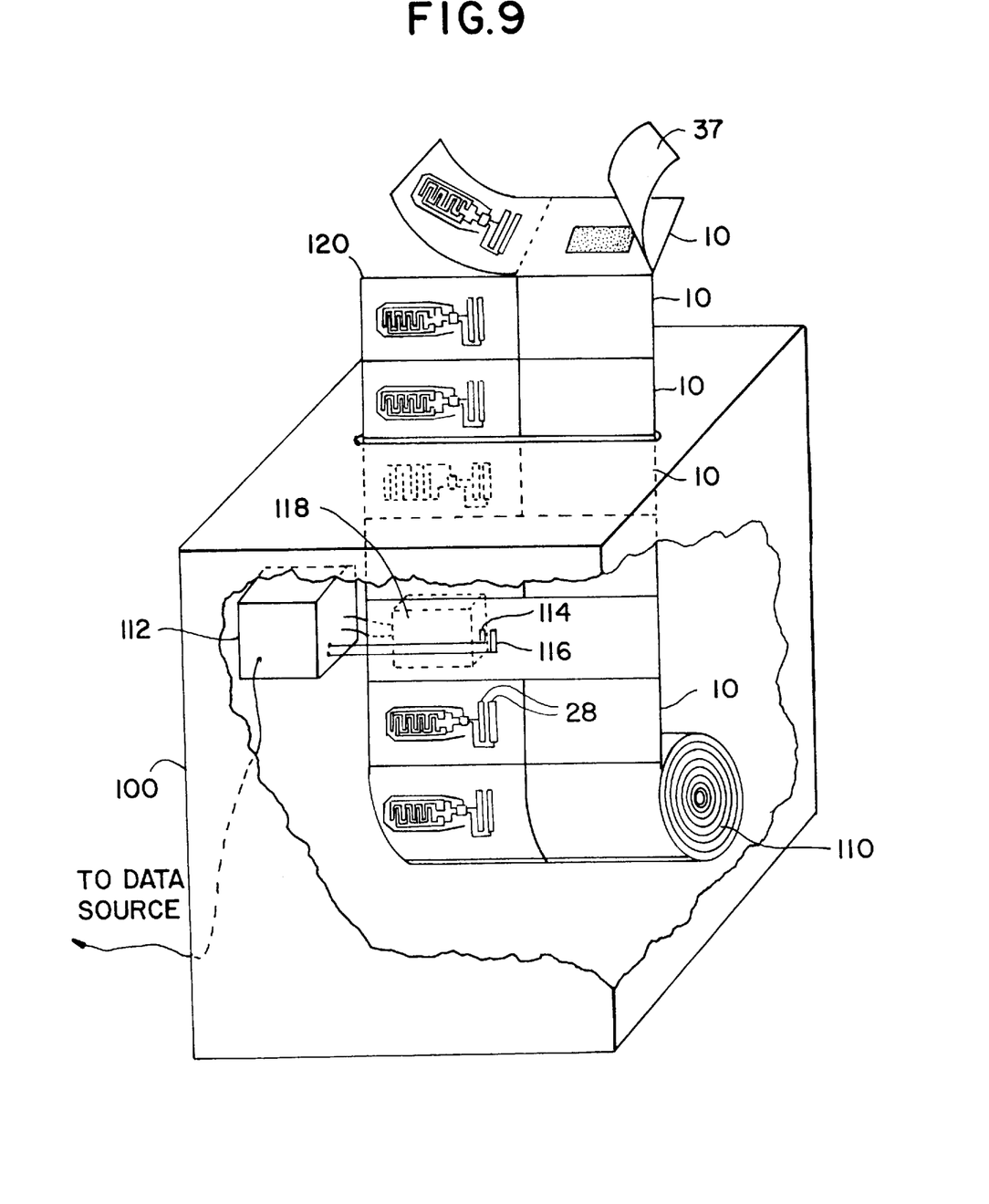
FIG. 9 is a perspective view of the data input means.

The second battery portion 32 is located such that when the strip 12 is folded back upon itself, the second battery portion 32 contacts and overlays the first battery portion 18. An adhesive 33 coats the portion of the strip 12 surrounding the second battery portion 32. This ensures that positive contact between the two battery portions 18, 32 will be maintained after the strip 12 is folded back upon itself. The adhesive 33 also seals the electrolytic material within the lip 29 to prevent leakage. A second area 35 of the strip is kept free from adhesive. Backing material 37, as shown in FIG. 9, overlays the adhesive 33 and the second battery portion 32 to ensure that unwanted materials do not adhere to the strip 12. The backing material 37 is removed by the user when operation of the label 10 is desired. A perforation 31 is also provided about the center of the strip 12.

Figure 2:
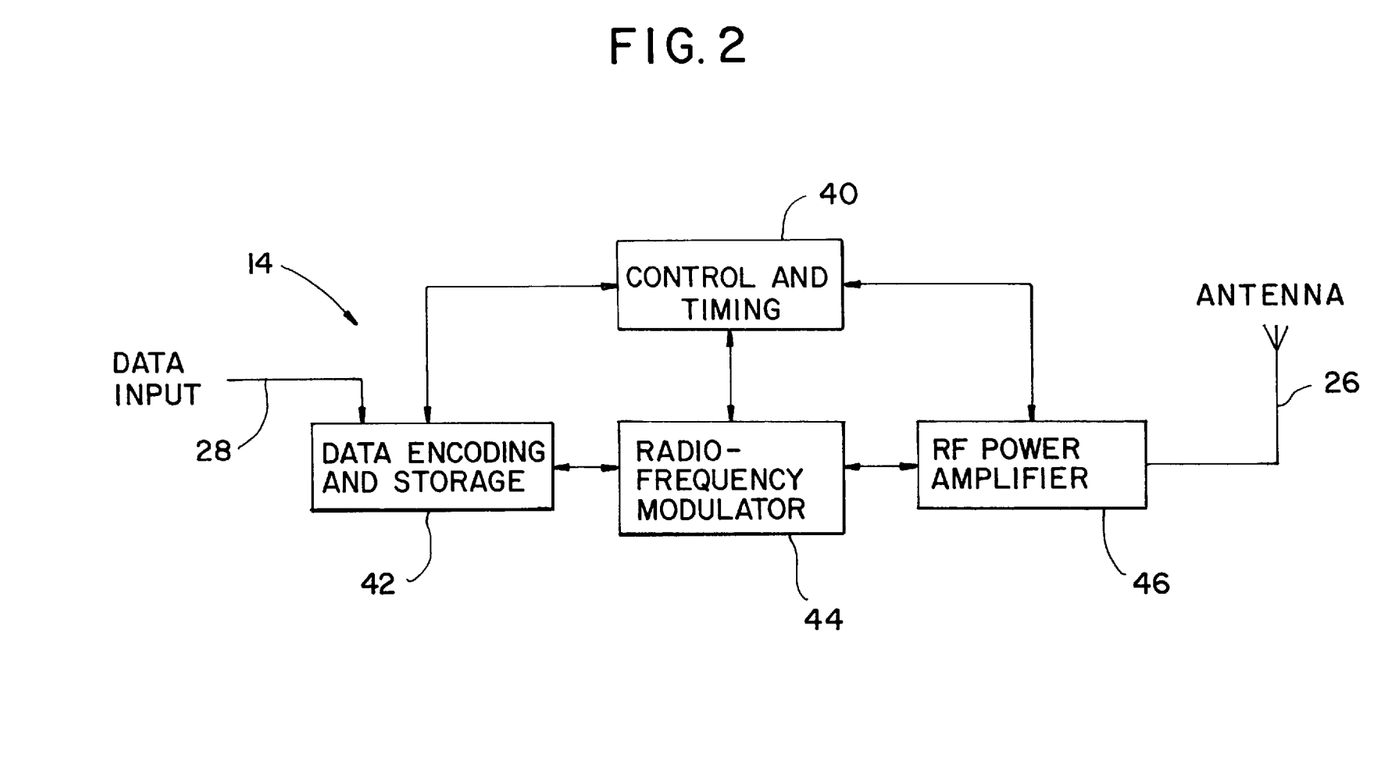
FIG. 2 is block diagram of the control circuit used with the RF identification label shown in FIG. 1.

Referring to FIG. 2 the control circuit 14 comprises a control and timing module 40, a data encoding and storage module 42, an RF modulator 44 and a power amplifier 46. In the preferred embodiment, the control module 40 and the data module 42 are software-implemented modules. To program the label 10 with the desired message or data to be transmitted, data is input from a data input source 100 (shown in FIG. 9) into the label 10 via the programming contacts 28. The data enters the data encoding and storage module 42 in binary form. This data typically pertains to a package upon which the label 10 is adhesively mounted. This data may include the contents of the package, the destination of the package, the source of the package, the weight of the package or any other data known about the package at the time the label 10 is programmed.

The data encoding and storage module 42 includes a non-volatile random access memory (NVRAM) for storing and retrieving data. The binary data is encoded and compressed by the data module 42 as it is stored in memory. Additionally, error-detection and error-correction information are added by the data module 42 to guarantee that the data decoded by the receiver is error-free. Compression and encoding of the data may be performed prior to inputting the data into the data module 42. This reduces the complexity of both the control circuit 14 and the data module 42 and permits data to be encrypted by the data input source 100 to provide security, if desired.

The radio-frequency (RF) modulator 44 uses frequency-shift keying (FSK) to modulate the carrier signal. Alternatively, phase-shift keying (PSK) or any other known modulation method may be used. The binary data signal output from the data module 42 is mixed with a selected RF carrier for transmission. In the preferred embodiment, the selected RF carrier is 908 MHZ. The power amplifier 46 increases the power of the signal provided by the modulator 44 and output to the antenna 26.

The control and timing module 40 oversees all operations of the control circuit 14. The control module 40 includes a processor which directs the encoding and storage of data by the data module 42. Once the label 10 has been assembled and the power source is available, the control module 40 activates the data module 42, the RF modulator 44 and the power amplifier 46. Once activated, the label 10 transmits the stored data over the selected RF carrier for reception by an external receiver. Preferably, the data is transmitted at irregular intervals, with several transmissions occurring each second. By staggering the transmission intervals, a receiver has the opportunity to receive a complete transmission from each of several labels 10 that may be in its reception area.

In the preferred embodiment, portions of the encoded data which is considered to be of a higher priority are transmitted more frequently than non-priority encoded data. For example, routing and unique identification information are transmitted in every transmission, whereas the entire contents stored in the data module 42, which may include additional information such as the contents, weight, date and place of origin of the package, are transmitted in every third transmission.

Figure 11:
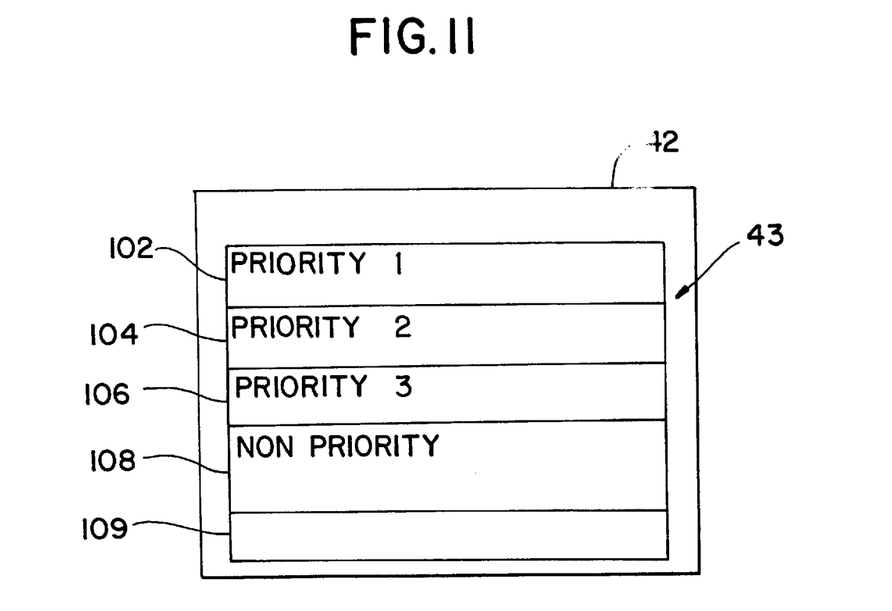
FIG. 11 is a block diagram of the memory within the data module.

Data is selectively configured and stored in memory 43, as shown in FIG. 11, to enable separation of priority data from non-priority data. In an application such as the routing of a package for mailing, the zip code, city, street, address number and name of the receiver of the package are required to ensure proper delivery of the package. The highest priority data 102, such as the zip code, is transmitted in every transmission. The lower priority data 104, 106 and the non-priority data 108 are transmitted at less frequent intervals.

The memory 43 may also be programmed to transmit a message after a predetermined duration has elapsed upon activating the label 10. For example, if the label 10 is still on a package after one week, the label 10 will transmit a message indicating that the package is lost. This will enable easier identification and tracking of packages which may be misplaced. The data module 42 may be specifically programmed for each application. Accordingly, data may be transmitted in any desired format or interval.

In an alternative embodiment, the label 10 receives an RF signal from an external source, such as an RF transmitter. This signal may include control instructions to control operation of the control module 40 or additional data for storage in the data module 42. In this embodiment, the modulator 44 is a modulator/demodulator (modem) and the preferred receive RF carrier is 2.45 GHz. The received RF signal is demodulated by the modem 44 and processed by the control module 40. The control module 40 implements the control instructions and stores received data in the data module 42. The received data may erase data currently stored in the data module 42 or may be added to the data. In this manner, the contents of the data module 42 may be updated as the package progresses along its predetermined route. Additionally, the desired destination of the package may also be changed to from its original destination to a new destination as the package is en route.

The received control instructions enable or disable specific operating modes of the of the label 10. For example, if the label 10 is used for routing airline luggage, it would be desirable to instruct the labels 10 to cease all RE transmissions (i.e. "no RE transmission" mode) prior to loading the luggage into the cargo hold of an airplane. Thus, communication interference concerns are eliminated during flight. An "RE transmission" mode may be enabled when unloading the luggage from the cargo hold.

Referring again to FIG. 9, the data input means 100 is shown. Unprogrammed labels 10 are fed from a supply roll 110 to a programming mechanism 112. Although a supply roll 110 is shown, a fan fold box may also be utilized. The programming mechanism 112 includes programming probes 114, 116 and a print head 118 which contact opposite sides of the label 10. The programming probes 114, 116 contact corresponding programming contacts 28 on the label 10 as the label 10 is fed past the programming probes 114, 116. Simultaneously, the print head 118 prints the information on the reverse side of the label 10. Direct thermal, thermal transfer, ink jet or other well known printing techniques may be used to print human- or machine-readable information on one side of the label 10.

Figure 10:
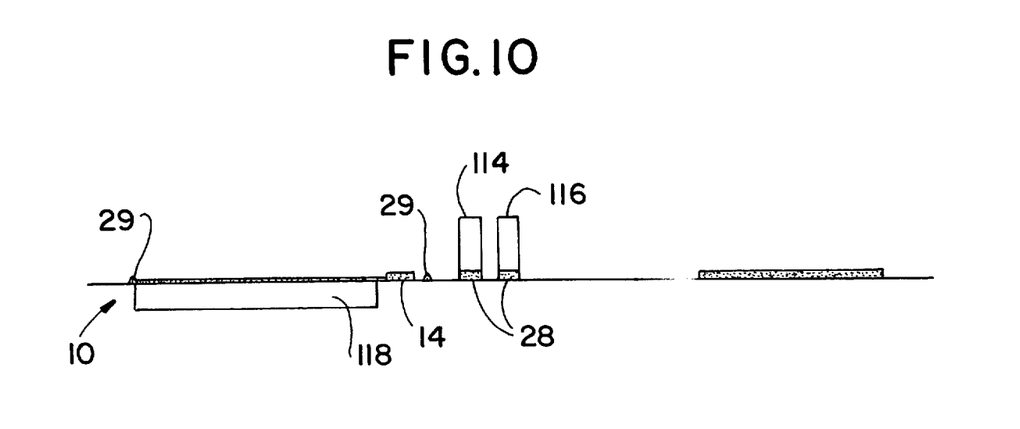
FIG. 10 is a section view along line 10-10 in FIG. 1.

The data input means 100 receives the data to be programmed from an external source (not shown) such as a personal computer. The data input means 100 programs the desired data into the label 10 and prints the visible information on the surface of the label 10. The programming probes 114, 116 also provide a temporary source of power to the control circuit 14 during programming of the label 10. The contact between the programming probes 114, 116 and the programming contacts 128 and the contact between the print head 118 and the label 10 is shown in more detail in FIG. 10.

Referring again to FIG. 9, once the label 10 is dispensed, the label 10 is separated from adjoining labels 10 by tearing along a perforation 120 between labels 10. The label 10 is then affixed to the item to be tracked and is activated by pressing the second battery portion 32 against the first battery portion 18.

Figure 3:
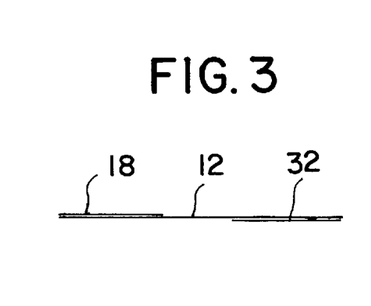
FIG. 3 is a side elevation of the RF identification label of FIG. 1 showing an initial stage in the activation of the label.
Figure 4:
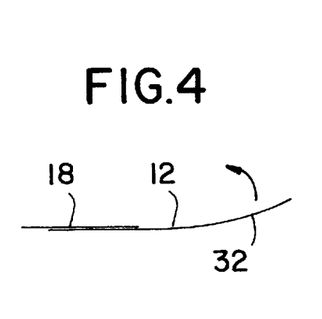
FIG. 4 is a side elevation of the RF identification label of FIG. 1 showing an intermediate stage in the activation of the label.
Figure 5:
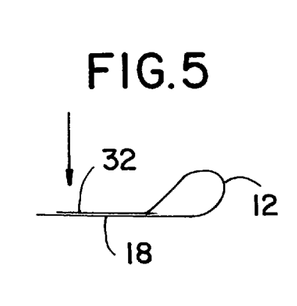
FIG. 5 shows a side elevation of the identification label of FIG. 1 in its activated position.

To activate the label 10, the flexible strip 12 is folded back upon itself as illustrated in FIGS. 3, 4 and 5. The electrolyte 32 operatively contacts the anode 20 and cathode 22 of the first battery component 18, thereby completing the battery and powering the control circuit 14. At that point, the data which has been preprogrammed into the label 10 is transmitted by the label 10 via the selected RF carrier for reception by a receiving means. The active RF identification label 10 is particularly suited for use as an airline baggage label where the strip 12 is folded around the handle of a piece of luggage and the adhesive-free portion 35 of the strip 12 contacts the handle. The perforation 31 facilitates easier removal of the label 10 after use.

Figure 6:
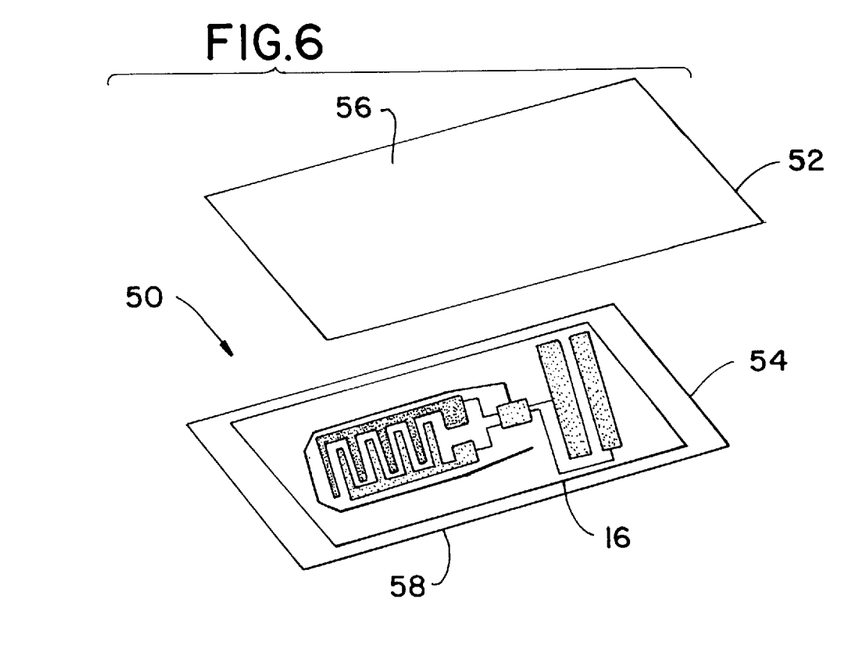
FIG. 6 is an elevated view of an alternate embodiment of an RF identification label according to the teachings of the present invention.

With reference to FIG. 6 there is shown an alternate embodiment of the RF identification label 50. The RF identification label 50 is constructed in the same manner and with the same components identified with respect to the label 10 depicted in FIGS. 1–5, with the exception that two separate pieces of material 52, 54 are provided instead of a unitary strip 12. The label 50 is activated by adhering the two pieces 52, 54 together such that the first battery portion 18 becomes operatively associated via the second battery portion adhesive 32. To facilitate adherence of the identification label 50 to boxes or other items, an adhesive is provided on the outer side 52 of portion 52 or outer side 58 of portion 54.

Figure 7:
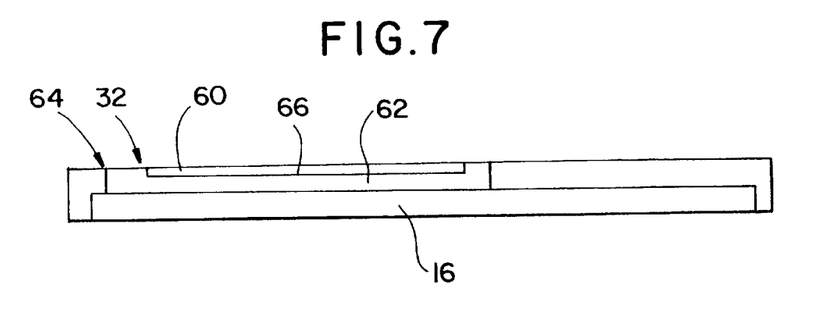
FIG. 7 is side view of a second alternate embodiment of an RF identification label according to the teachings of the present invention.

In a second alternative embodiment, shown in FIG. 7, the electrolyte 32 comprises two inert components 60, 62 which are separately encapsulated. Both components are maintained in a sealed enclosure 64. The battery is activated by fracturing the encapsulating material 66 between the components, 60, 62. The sealed enclosure 64 maintains the activated electrolyte 32 in contact with the anode 20 and cathode 22.

Figure 8:
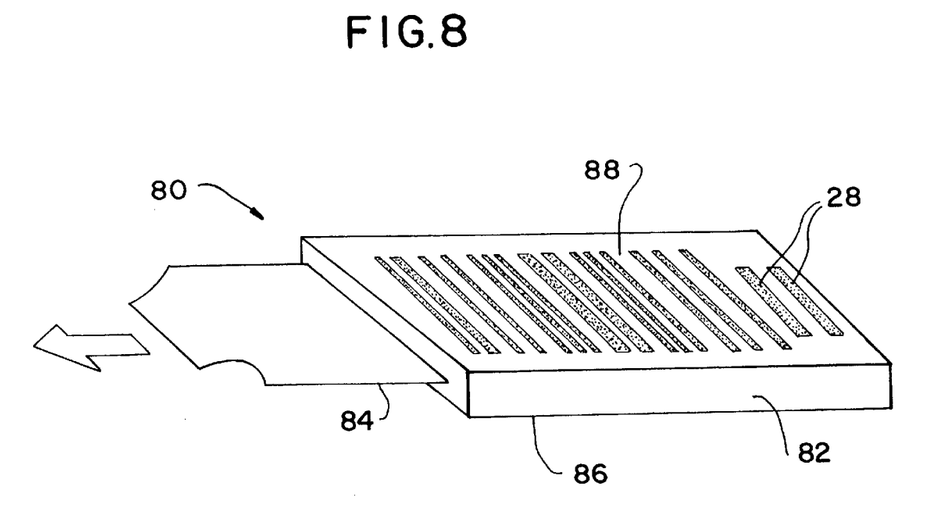
FIG. 8 is an elevated view of a third alternate embodiment of an RF identification label according to the teachings of the present invention.

A third alternative embodiment is shown in FIG. 8. In this embodiment, the label 80 comprises a unitary housing 82 which encloses the control circuit 14 and the battery. In this embodiment, the battery is a zinc-air battery comprising zinc and an aqueous solution of potassium hydroxide. As is well understood by those skilled in the art, exposure of the solution to air (oxygen) will activate the battery 81. In its inert form the solution is isolated from air with an isolating strip 84. To activate the label 80, the isolating strip 84 is removed from the housing 82, thereby exposing the solution to air. Programming contacts 28 are provided on one face of the housing 82 for access to the control circuit 14 by the data input means 100. An adhesive 86 is applied to the second face of the label 80 to affix the label 80 onto a package. Additionally, a bar code label 88 may be provided for optical identification of the label 80.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

We claim:

1. An active RF identification label comprising:
   a memory for storing data;
   means for generating a RF identification signal which requires a power source;
   an activatable battery connected to said RF generating means for providing the required power;
   said battery comprising at least a first component and a separate second component, said first and second components being physically isolated such that said battery is activated when said first component comes in operative physical contact with said second component;
   means for permanently maintaining said first and second battery components in operative contact with each other after activation of the battery whereby an RF identification signal is producible on demand by activation of said battery; and
   a control unit, coupled to said battery, said RF signal generating means and said memory, for controlling the generation of said RF identification signal to selectively output data from said memory into said RF identification signal for transmission,
   said control unit being programmable to output data from said memory having a hither priority more frequently than data having a lower priority for transmission.

2. An active RF identification label according to claim 1 wherein said first battery component comprises an anode and a cathode supported on a dielectric base and said second battery component comprises an electrolyte.

3. An active RF identification label according to claim 2 wherein the electrolyte comprises an adhesive applied to a supporting substrate such that the substrate is adhered to the anode and cathode to activate the battery, whereby the adhesive comprises said means for maintaining said first and second battery components in operative physical contact with each other.

4. An active RF identification label according to claim 3 further comprising a thin, flat, flexible, rectangular non-conductive piece of material;

a portion proximate one end of said rectangular material comprising the substrate for said electrolyte and said battery anode and cathode and said RF frequency generated means being mounted proximate an opposite end whereby said battery is activated by folding and adhering said rectangular strip of material back upon itself.

5. An RF identification label for tracking an object comprising:

a memory for storing data;

means for generating a RF identification signal;

a selectively activated battery to power said RF generating means, said battery having electrically isolated components which are electrically connected upon said selection;

a control unit, coupled to said battery, said RF signal generating means and said memory, for controlling the generation of said RF identification signal to selectively output data from said memory into said RF identification signal for transmission; and means for affixing the label to an object to be tracked, said control unit being programmable to output data from said memory having a higher priority more frequently than data having a lower priority for transmission.

6. An active RF identification label according to claim 5 wherein said battery components comprise an anode and cathode supported on a dielectric base and an electrolyte.

7. An active RF identification label according to claim 6 wherein the electrolyte comprises an adhesive applied to a supporting substrate such that the substrate is adhered to the anode and cathode to activate the battery whereby the adhesive comprises means for maintaining the anode and the cathode in operational contact with each other.

8. An RF identification label for tracking an object comprising:

a memory for storing data;

means for generating a RF identification signal;

a selectively activated battery to power said RF generating means, said battery having electrically isolated components which are electrically connected upon said selection;

a control unit, coupled to said battery, said RF signal generating means and said memory, for controlling the generation of said RF identification signal to selectively output data from said memory into said RF identification signal for transmission; and means for affixing the label to an object to be tracked, said control unit being programmable to output data from said memory having a higher priority more frequently than data having a lower priority for transmission.

9. The label of claim 8 wherein said battery components comprise a first battery component having an anode and a cathode and a second battery component having an electrolyte.

10. An active RF identification label according to claim 9 wherein the electrolyte comprises an adhesive applied to a supporting substrate such that the substrate is adhered to the anode and cathode to activate the battery whereby the adhesive comprises means for maintaining said anode and said cathode in operational contact with each other.

11. The label of claim 1 wherein said control unit is programmable to output said data at irregular intervals.

12. The label of claim 1 wherein said memory is programmable to output data for transmission after a predetermined time period following activation of the battery.

13. An RF identification label comprising:

a memory for storing data;

means for generating a RF identification signal;

a selectively activatable battery to power said RF generating means;

a control unit, coupled to said battery, said RF signal generating means and said memory, for controlling the generation of said RF identification signal to selectively output data from said memory into said RF identification signal for transmission; and said control unit being programmable to output data from said memory having a higher priority more frequently than data having a lower priority for transmission.

* * * * *

UNITED STATES PATENT AND TRADEMARK OFFICE
CERTIFICATE OF CORRECTION

PATENT NO. : 5,838,253
DATED : November 17, 1998
INVENTOR(S) : Wurz et al.

It is certified that error appears in the above-identified patent and that said Letters Patent is hereby corrected as shown below:

At column 5, line 10, delete "RE" and insert therefor --RF--.

At column 5, line 11, delete "RE" and insert therefor --RF--.

At column 5, line 14, delete "RE" and insert therefor --RF--.

In claim 1, column 6, line 63, delete "hither" and insert therefor --higher--.

Signed and Sealed this

First Day of June, 1999

Attest:

Q. TODD DICKINSON

Attesting Officer

Acting Commissioner of Patents and Trademarks